United States Patent
Sato

(10) Patent No.: US 7,969,499 B2
(45) Date of Patent: Jun. 28, 2011

(54) LENS BARREL AND IMAGE PICKUP APPARATUS

(75) Inventor: Hiroshi Sato, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 523 days.

(21) Appl. No.: 12/106,618

(22) Filed: Apr. 21, 2008

(65) Prior Publication Data

US 2008/0266404 A1   Oct. 30, 2008

(30) Foreign Application Priority Data

Apr. 24, 2007   (JP) ................ 2007-113935

(51) Int. Cl.
- G02B 13/16 (2006.01)
- G02B 3/00 (2006.01)
- G02B 7/00 (2006.01)
- G02B 9/00 (2006.01)
- G02B 11/00 (2006.01)
- G02B 15/00 (2006.01)
- G02B 25/00 (2006.01)
- H04N 5/225 (2006.01)
- G03B 17/00 (2006.01)

(52) U.S. Cl. ................. 348/335; 396/55; 359/642

(58) Field of Classification Search . 348/208.99–208.13
See application file for complete search history.

(56) References Cited

U.S. PATENT DOCUMENTS

| 7,689,108 B2 * | 3/2010 | Hosoda | 396/55 |
| 2006/0092524 A1 * | 5/2006 | Konno | 359/678 |
| 2007/0031134 A1 * | 2/2007 | Kuroda et al. | 396/55 |

FOREIGN PATENT DOCUMENTS

| JP | 2003-110929 | 4/2003 |
| JP | 2004-219516 | 8/2004 |

* cited by examiner

*Primary Examiner* — Jason Chan
*Assistant Examiner* — Pritham Prabhakher
(74) *Attorney, Agent, or Firm* — Finnegan, Henderson, Farabow, Garrett & Dunner, L.L.P.

(57) ABSTRACT

A lens barrel includes: an image pickup optical system; an image pickup element; and a plurality of reflection members including first to n-th reflection members in order from the subject. The first reflection member is arranged at a position to bend an optical path of an incident light flux to enter the image pickup optical system. An (n−1)-th reflection member is arranged at a position to bend an optical path in a direction in a plane perpendicular to the optical path of the incident light flux. The n-th reflection member is arranged at a position closest to the image plane to bend an optical path in a direction parallel to the optical path of the incident light flux. The lens barrel further includes an actuator for moving the image pickup element in a plane perpendicular to an optical path bent by the n-th reflection member for stabilizing an image.

10 Claims, 8 Drawing Sheets

50: LENS BARREL
60: IMAGE STABILIZING MECHANISM
OA, OB, OC: OPTICAL AXIS
S: APERTURE/SHUTTER UNIT
1: FIRST LENS GROUP
11, 13: LENS
12: PRISM
2: SECOND LENS GROUP

100: IMAGE PICKUP APPARATUS
50: LENS BARREL
51: OPENING
52: FLASH EMITTING SCREEN
53: FLASH UNIT
54: IMAGE RECORDING MEMORY
55: BATTERY
56: RELEASE BUTTON
57: MAIN SWITCH
58: IMAGE DISPLAY SECTION

50: LENS BARREL
60: IMAGE STABILIZING MECHANISM
OA, OB, OC: OPTICAL AXIS
S: APERTURE/SHUTTER UNIT
1: FIRST LENS GROUP
11, 13: LENS
12: PRISM
2: SECOND LENS GROUP

2k: SECOND LENS GROUP
  LENS FRAME
3: THIRD LENS GROUP
5: PRISM
5h: PRISM HOLDER
6: OPTICAL FILTER
7: IMAGE PICKUP ELEMENT
8: SOLENOID
8p: PLUNGER
9: TENSILE COIL SPRING
10: MAIN BARREL

60: IMAGE STABILIZING MECHANISM
OB, OC: OPTICAL AXIS
5: PRISM
5h: PRISM HOLDER
5p: PROTRUSION
6: OPTICAL FILTER
8: SOLENOID
8p: PLUNGER
9: TENSILE COIL SPRING
61P: FIRST DRIVE ACTUATOR
61Y: SECOND DRIVE ACTUATOR

61s: SHAFT
61w: WEIGHT
66: IMAGE PICKUP ELEMENT
 HOLDING CASE
66f: ENGAGEMENT SECTION
66h: SLIT
67: TRAVELING PLATE
67f: ENGAGEMENT SECTION
68: FIXING PLATE

MINIMUM DISTANCE

50: LENS BARREL
60: IMAGE STABILIZING MECHANISM
OA, OB, OC: OPTICAL AXIS
S: APERTURE/SHUTTER UNIT
1: FIRST LENS GROUP
11, 13: LENS 12: PRISM
2: SECOND LENS GROUP
2k: SECOND LENS GROUP LENS FRAME

3: THIRD LENS GROUP
4: FOURTH LENS GROUP
5: PRISM
5h: PRISM HOLDER
6: OPTICAL FILTER
7: IMAGE PICKUP ELEMENT
8: SOLENOID
8p: PLUNGER
9: TENSILE COIL SPRING
10: MAIN BARREL

60: IMAGE STABILIZING MECHANISM
OB, OC: OPTICAL AXIS
5: PRISM
5h: PRISM HOLDER
5p: PROTRUSION
6: OPTICAL FILTER
8: SOLENOID
8p: PLUNGER
9: TENSILE COIL SPRING

61P: FIRST DRIVE ACTUATOR
61Y: SECOND DRIVE ACTUATOR
61r: LEAD SCREW
66: IMAGE PICKUP ELEMENT
    HOLDING CASE
66h: SLIT
66n: THREADING SECTION
67: TRAVELING PLATE
67n: THREADING SECTION
68: FIXING PLATE

50: LENS BARREL
OA, OD: OPTICAL AXIS
A, B, C: REFLECTION SURFACE
7: IMAGE PICKUP ELEMENT

US 7,969,499 B2

LENS BARREL AND IMAGE PICKUP APPARATUS

This application is based on Japanese Patent Application No. 2007-113935 filed on Apr. 24, 2007, in Japanese Patent Office, the entire content of which is hereby incorporated by reference.

TECHNICAL FIELD

The present invention relates to a lens barrel including an image pickup optical system with a reflection member bending an optical path, and to an image pickup apparatus equipped with this lens barrel.

BACKGROUND

In the conventional art, a so-called folded type optical system in which a reflection surface is arranged to bend the optical path has been put into commercial use. This is mounted on a so-called digital camera which employs an image pickup element therein. One of the techniques known in the conventional art is the image pickup apparatus equipped with such a folded type optical system which is arranged across almost the entire width of the image pickup apparatus in the lateral direction when the image pickup apparatus at the standard posture is viewed from the subject side (e.g., Unexamined Japanese Patent Application Publication No. 2004-219516).

In the meantime, an image stabilization technique for obtaining a sharp image by correcting the misalignment of the optical axis caused by camera shake at the time of image pickup has also been put into commercial use. This image stabilizing technique is available in three types: (1) part of an image pickup optical system is moved, (2) the entire image pickup optical system is moved, and (3) an image pickup element is moved.

As an apparatus implementing the type of the technique of image stabilization by moving an image pickup element, there is an image pickup apparatus known in the conventional art wherein other electrical parts are arranged on the side of the flexible printed circuit whose end is connected to the image pickup element and which moves with the image pickup element (e.g., Unexamined Japanese Patent Application Publication No. 2003-110929).

In another apparatus known in the conventional art, the image pickup element arranged at the image plane of the folded type optical system is moved to stabilizing image.

The image pickup apparatus carrying the aforementioned folded type optical system has an advantage that a slim configuration can be formed without the lens barrel being protruded or the outside shape of the image pickup apparatus being changed even when the power is varied. However, there has been an intense demand for further downsizing.

In the case of meeting such a demand by stabilizing image through the movement of an image pickup element arranged on the image plane of the folded type optical system, the lens barrel can be made slender if an actuator or a moving mechanism for moving the image pickup element are arranged on the rear surface of the image pickup element. However, the length is increased by the dimension corresponding to the thickness of the actuator and moving mechanism. In the meantime, when the actuator for driving the image pickup element is mounted on the side surface of the image pickup element, the lens barrel will be thicker.

SUMMARY

To solve these problems, there is provided a compact lens barrel including a folded type optical system and an image pickup element arranged at the image plane thereof, wherein this image pickup element is moved for image stabilization.

An embodiment of the present invention is a lens barrel comprising: an image pickup optical system; an image pickup element; and a plurality of reflection members including first to n-th reflection members in order from the subject. The first reflection member is arranged at a position to bend an optical path of an incident light flux to enter the image pickup optical system. A (n−1)-th reflection member is arranged at a position to bend an optical path in a direction on a plane perpendicular to the optical path of the incident light flux. The n-th reflection member is arranged at a position closest to an image plane of the image pickup optical system to bend an optical path in a direction parallel to the optical path of the incident light flux. The lens barrel further comprises an actuator for moving the image pickup element in a plane perpendicular to an optical path bent by the n-th reflection member for stabilizing an image.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
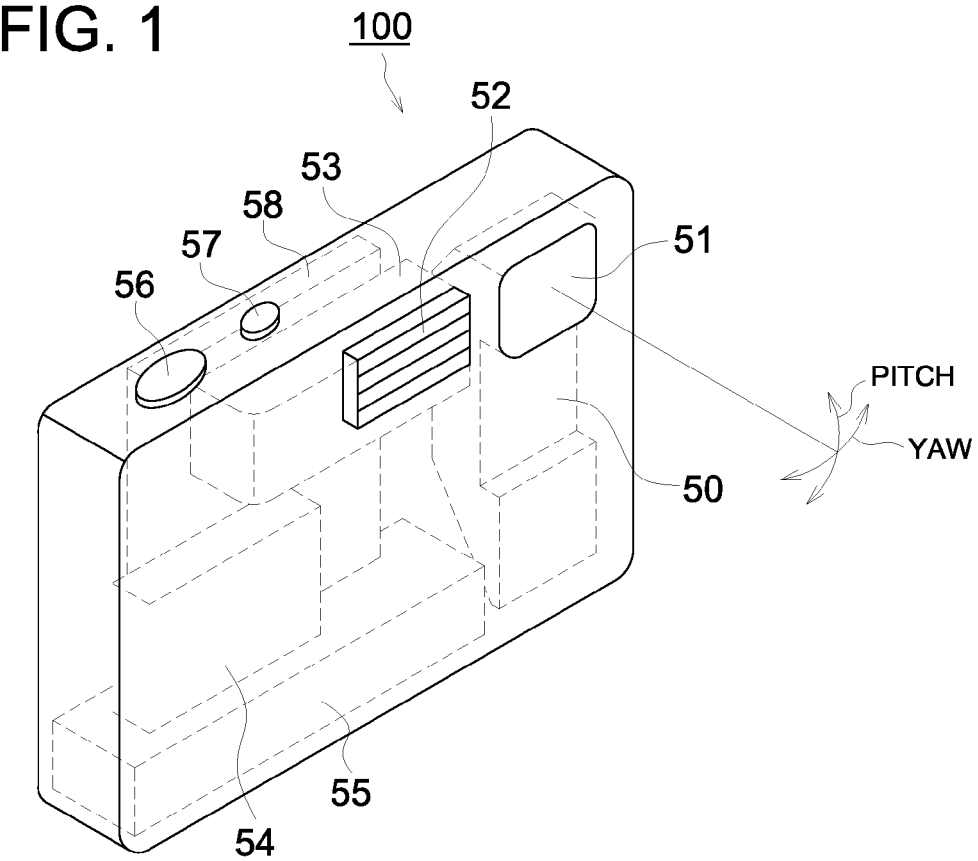
FIG. 1 is a diagram representing an example of the internal arrangement of the major component units of an image pickup apparatus as an embodiment.

Preferred embodiments of the present invention will be described below.

One of the preferred embodiments is a lens barrel comprising: an image pickup optical system comprising a plurality of lenses transmitting a light flux from a subject; an image pickup element for photo-electrically converting the light flux from the subject transmitted by the image pickup optical system; and a plurality of reflection members including first to n-th reflection members in order from the subject. The first reflection member is arranged at a position to bend an optical path of an incident light flux to enter the image pickup optical system. An (n−1)-th reflection member is arranged at a position to bend an optical path in a direction on a plane perpendicular to the optical path of the incident light flux. The n-th reflection member is arranged at a position closest to an image plane of the image pickup optical system to bend an optical path in a direction parallel to the optical path of the incident light flux. The lens barrel further comprises an actuator for moving the image pickup element in a plane perpendicular to an optical path bent by the n-th reflection member for stabilizing an image.

In the above embodiment, the image pickup element may be arranged at a position closer to the subject than an optical path bent by the (n−1)-th reflection member.

In the above embodiment, the n-th reflection member and the image pickup element may move in a direction parallel to an optical path bent by the (n−1)-th reflection member for an adjustment of a focal point of the image pickup optical system.

In the above embodiment, the actuator may move the n-th reflection member and the image pickup element for the adjustment of the focal point.

In the above embodiment, the actuator may be arranged on a side surface of the image pickup element.

In the above embodiment, the image pickup optical system may comprise in order from the subject: a first lens group having a negative refractive power; a second lens group having a positive refractive power and moving for varying power of the image pickup optical system; and a third lens group having a positive refractive power.

In the above embodiment, the image pickup optical system may comprise in order from the subject: a first lens group having a positive refractive power; a second lens group having a negative refractive power and moving linearly for varying power of the image pickup optical system; a third lens group having a positive refractive power; and a fourth lens group having a positive refractive power and moving linearly for varying power of the image pickup optical system.

Another preferred embodiment is an image pickup apparatus comprising the above lens barrel.

According to the above embodiments, there is provided a compact lens barrel including a folded type optical system and an image pickup element arranged at the image plane thereof, wherein this image pickup element is moved for image stabilization.

The following describes the details of embodiments of the present invention with reference to drawings without the present invention being restricted thereto.

FIG. 1 is a diagram representing an example of the internal arrangement of the major component units of an image pickup apparatus as an embodiment. FIG. 1 is a perspective view showing image pickup apparatus 100 from the subject side.

As shown in FIG. 1, in image pickup apparatus 100, lens barrel 50 incorporating the folded type image pickup optical system with variable power is arranged as illustrated in such a way that the light flux from the subject is captured through opening 51. This opening 51 has a lens barrier which assumes two states: the open state wherein the opening 51 is exposed, and the closed state wherein it is covered.

In the image pickup apparatus 100, there is provided flash emitting screen 52, and flash unit 53 including a reflective shade, xenon tube, main capacitor and circuit board arranged on the rear of the flash emitting screen. In FIG. 1, there is shown card type image recording memory 54, and battery 55 that supplies power to various parts of the image pickup apparatus. The image recording memory 54 and the battery 55 can be mounted or dismounted in/from the image pickup apparatus through a covered opening section.

Release button 56 is mounted on the top surface of the image pickup apparatus 100. Preparation for image pickup, namely, focusing or light measuring operation is performed by pressing the button to the first step (hereinafter referred to as "ON operation of the switch S1"), and exposure for image pickup is performed by pressing the button to the second step (hereinafter referred to as "ON operation of the switch S2"). In FIG. 1, main switch 57 is provided for selecting between the ON state or OFF state of the image pickup apparatus. When the main switch 57 is set to the ON state, the lens barrier is set to the open state, with the result that operations of various sections are started. If the OFF state is selected by the main switch 57, the lens barrier is set to the close state, with the result that operations of various sections are stopped.

On the rear surface of the image pickup apparatus 100, image display section 58 constructed by a device such as an LCD and organic EL for displaying images and text information is arranged. On the rear surface of the image pickup apparatus 100, there are further mounted operation members such as a zoom button for zoom-up and -down operations, a reproduction button for reproducing the captured image, a menu button for showing various menus on the image display section 58 and a selector buttons for selecting a desired function from the display.

A circuit board connecting various sections and mounting various electronic parts thereon is arranged between these major component units, whereby various major component units are driven and controlled. Further, the image pickup apparatus includes an external input/output terminal, strap mounting section and tripod seat.

In the image pickup apparatus of FIG. 1, lens barrel 50 is arranged along the direction of the short side in the rectangular external shape of the image pickup apparatus as viewed from the subject. However, it can be arranged in the direction of the long side.

Figure 2:
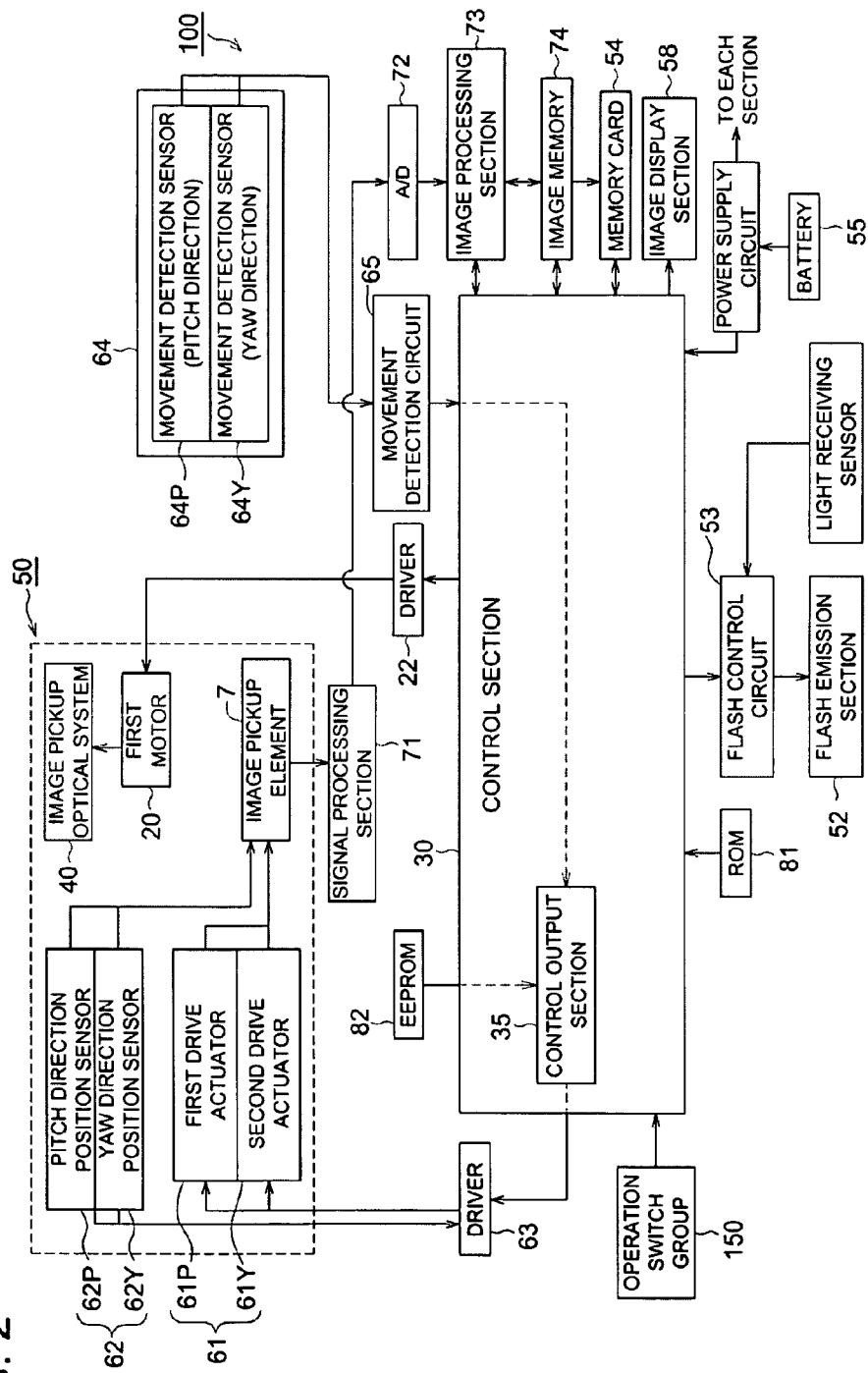
FIG. 2 is a block diagram showing the brief overview of an image pickup apparatus as an embodiment.

FIG. 2 is a block diagram showing a brief overview of image pickup apparatus 100 as an embodiment.

As shown in FIG. 2, in image pickup optical system 40 in lens barrel 50, first motor 20 moves a prescribed lens group, so that power of the image pickup optical system is varied. Further, in the lens barrel 50, there is provided two actuators 61 that move image pickup element 7 in the direction to cancel image movement in the yaw direction and pitch direction shown in FIG. 1. The movement of the image pickup element 7 is conducted by first drive actuator 61P and second drive actuator 61Y.

There is further provided sensor 62 that detects a moved position of the image pickup element 7 by the actuators 61, and a position in the pitch direction is detected by pitch direction position sensor 62P and a position in the yaw direction is detected by yaw direction position sensor 62Y.

The actuators 61 are driven by driver 63 controlled by control section 30. The first motor 20 is also driven by driver 22 controlled by the control section 30.

Movement detection sensor 64 for detecting a movement detects a movement of the lens barrel 50. Specifically, movement detection sensor 64P detects the angular velocity in the pitch direction, which is in detail, inertial angular velocity (ground angular velocity), and movement detection sensor 64Y detects the angular velocity in the yaw direction.

Signals coming from the movement detection sensors 64P and 64Y are amplified by movement detection circuit 65 and filtering processing is applied to them. The signals are detected as signals showing "movement" to be inputted in the control section 30 constituted with, for example, a microcomputer.

In the control section 30, the prescribed software program stored in ROM 81 is executed with using RAM as a work area, and functions of respective sections operate. For example, control output section 35 obtains a current angle in each of a pitch direction and a yaw direction based on signals from the movement detection circuit 65, and obtains an output value of a servo-control system that makes a difference between the current angle and a target angle to be small. Namely, the control output section 35 generates a control instruction value for driving the image pickup element 7 for in-plane displacement to control the movement detected by the movement detection circuit 65. The control output section 35 outputs the generated control instruction values to the driver 63.

The driver 63 drives first drive actuator 61P and second drive actuator 61Y, based on the control instruction values. It causes in-plane displacement of the image pickup element 7, and image shake due to the lens barrel shake is corrected. Each of the pitch direction position sensor 62P and yaw direction position sensor 62Y is a sensor that detects a position of the image pickup element 7 that is driven by the actuators 61 for in-plane displacement, and controls driving of the image pickup element 7 for displacement on a feed back basis.

EEPROM 82 stores individual data such as zoom positions of the image pickup optical system 40 for varying power, and further stores adjusting data relating to a control of image stabilization.

In addition, on the image pickup apparatus 100, there are provided signal processing section 71 serving as a processing section that handles images obtained by the image pickup element 7, A/D converting section 72, image processing section 73 and image memory 74. An image of analog signals obtained by the image pickup element 7 is A/D-converted by A/D converting section 72 through signal processing section 71, then, prescribed image processing is applied to it with the image processing section 73, and the processed image is stored temporarily in image memory 74. The image stored in the image memory 74 is recorded on the memory card 54, or are processed by desired processing and is displayed on the image display section 58 as a live-view display image.

Further, to the control section 30, there are connected groups of operation switch 150 such as a cross-key button, a zoom-operation button, a mode-selection dial and a mode-setting button, and the image pickup apparatus 100 is operated by operations of a user based on that operations.

The following describes the details of the lens barrel 50 as an embodiment and its operation.

FIGS. 3(a) and 3(b) are schematic diagrams representing an example of the lens barrel 50 as an embodiment. FIG. 3(a) is a cross sectional view of the lens barrel 50. FIG. 3(b) is a diagram showing the movement between the W (wide-angle end) to T (telephoto end) of each lens group when the power is varied.

FIGS. 3(a) and 3(b) show first lens group 1 having a negative refractive power. The first lens group 1 includes lens 11 facing the subject and having optical axis OA; prism 12 as a reflection member bending an incident optical path corresponding to the optical axis OA approximately at a right angle; and lens 13 having optical axis OB corresponding to an optical path bent by the prism 12. This first lens group 1 is the lens group fixed on the main barrel 10.

FIGS. 3(a) and 3(b) further show second lens group 2 having a positive refractive power, and aperture/shutter unit S. The second lens group 2 is incorporated in the second lens group lens frame 2k. The aperture/shutter unit S has at least one of an aperture and shutter. The second lens group 2 and aperture/shutter unit S integrally moves with the second lens group lens frame 2k when varying power (hereinafter referred to as "zooming"), as shown in FIG. 3(b).

The second lens group 2 is located at a position much separated from the first lens group 1 at the wide-angle end, and moves toward the first lens group 1 as the power is varied to the long focus. This movement of the second lens group 2 is driven by a stepping motor, for example.

FIGS. 3(a) and 3(b) further show third lens group 3 having a positive refractive power and being fixed on the main barrel 10. This third lens group 3 is a lens group that does not move.

In FIGS. 3(a) and 3(b), there is prism 5 which is a reflection member wherein a reflection surface is provided on the slanting surface. It is incorporated in prism holder 5h.

In FIGS. 3(a) and 3(b), there are optical filter 6 formed by laminating an infrared ray cut-off filter or optical low-pass filter, and image pickup element 7. A CCD (Charge Coupled Device) type image sensor and CMOS (Complementary Metal-Oxide Semiconductor) type image sensor are utilized for the image pickup element. The optical filter 6 and image pickup element 7 are arranged on an optical path after being bent by the prism 5 corresponding to optical axis OC.

The optical axis OC corresponding to the optical path after being bent by the prism 5 extends in parallel direction to the optical axis OA corresponding to the optical path to be bent by the prism 12 as a reflection member arranged in the first lens group 1.

As illustrated, the optical filter 6 and image pickup element 7 are built onto the image stabilizing mechanism 60 with being arranged at closer position to the subject than the optical axis OB. The optical filter 6 and image pickup element 7 move integrally in the plane perpendicular to the optical axis OC, to stabilize an image.

Further, the prism holder 5h is provided with solenoid 8 in such a way that the prism holder 5h can be engaged with, or disengaged from the member constituting the image stabilizing mechanism 60 by plunger 8p driven by the solenoid 8. In the example of FIG. 3(a), when power is not supplied to the solenoid 8, the plunger 8p is driven by tensile coil spring 9 as an energizing member in the direction of engaging with the member constituting the image stabilizing mechanism 60. When power is supplied to the solenoid 8, the plunger 8p travels in the illustrated right direction against the force of the tensile coil spring 9 so that engagement is released.

Figure 4:
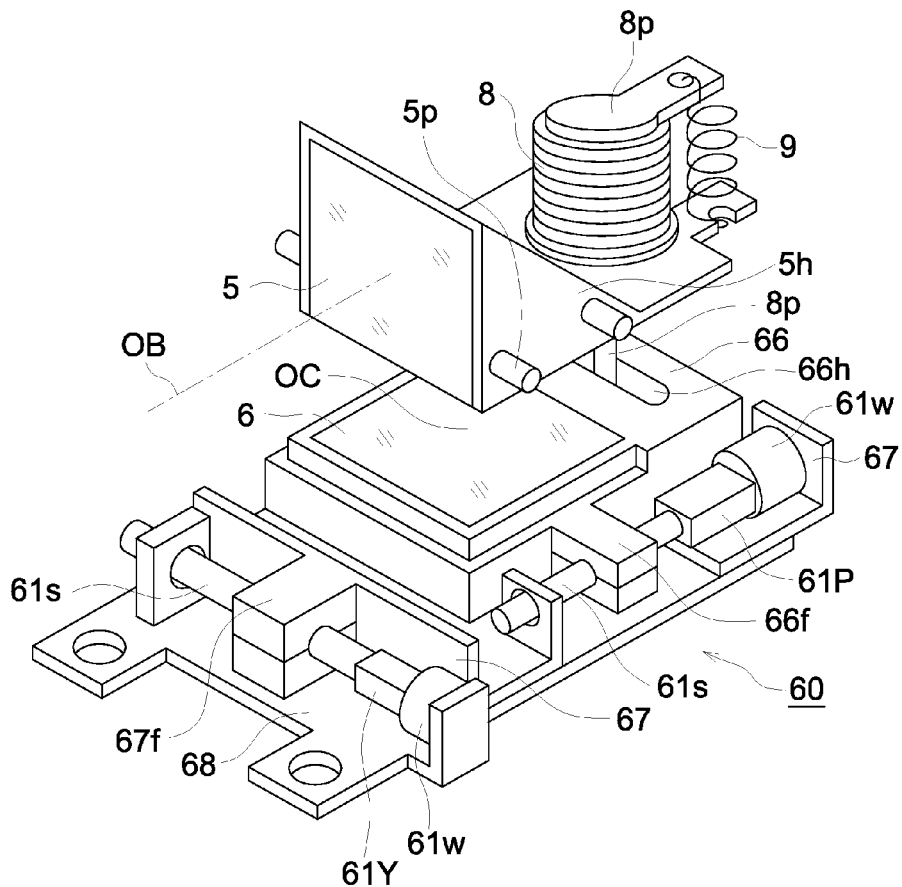
FIG. 4 is a perspective view representing the area around the prism holder of the lens barrel and image stabilizing mechanism in an embodiment.

FIG. 4 is a perspective view representing the area around the prism holder 5h of the lens barrel 50 and image stabilizing mechanism 60 in an embodiment. In the following diagrams, the members having the same functions are assigned with the same reference numerals to avoid duplication.

The image stabilizing mechanism 60 of FIG. 4 includes image pickup element holding case 66 for integrally holding the optical filter 6 and image pickup element 7; traveling plate 67 for holding the first drive actuator 61P that moves the image pickup element holding case 66 in the direction parallel to the optical axis OB; and fixing plate 68 for holding the second drive actuator 61Y that moves the image pickup element holding case 66 and traveling plate 67 in the direction perpendicular to the optical axes OC and OB. The fixing plate 68 is fixed on the main barrel 10.

The first drive actuator 61P and the second drive actuator 61Y of FIG. 4 are formed by lamination of the piezoelectric elements.

The first drive actuator 61P has its one end locked onto the traveling plate 67 through weight 61w, and has the other end fitted with shaft 61s. The shaft 61s is friction-engaged with engagement section 66f formed on image pickup element holding case 66. By controlling the gradient of the voltage applied to the first drive actuator 61P, the speed of piezoelectric element is changed between the directions in which the piezoelectric element is elongated and contracted, whereby the image pickup element holding case 66 engaged with shaft 61s by friction is moved in the direction parallel to the optical axis OB.

Similarly, the second drive actuator 61Y has its one end fixed onto the fixing plate 68 through weight 61w, and has the other end fitted with shaft 61s. The shaft 61s is friction-engaged with engagement section 67f formed on the traveling plate 67. By controlling the gradient of the voltage applied to the second drive actuator 61Y, the speed of the piezoelectric element is changed between the directions in which the piezoelectric element is elongated and contracted, whereby the traveling plate 67 engaged with shaft 61s by friction is moved in the direction perpendicular to the optical axes OC and OB.

The plunger 8p of the solenoid 8 arranged on the prism holder 5h is engaged with slit 66h formed on the image pickup element holding case 66 by the tensile coil spring 9, when power is not supplied. Further, protrusion 5p formed on the prism holder 5h is engaged with a guide groove parallel with the optical axis OB formed on the main barrel. When the first drive actuator 61P is driven in the state of engagement, the image pickup element holding case 66 and prism holder 5h are integrally moved in a direction of the optical axis OB. To put it another way, the focus can be adjusted by driving the first drive actuator 61P through the engagement between the prism holder 5h and image pickup element holding case 66.

Further, power is supplied to the solenoid 8 to move the plunger 8p against the force of the tensile coil spring 9 so that the prism holder 5h is disengaged from the image pickup element holding case 66, and to drive the first drive actuator 61P and the second drive actuator 61Y. Thereby, the image pickup element 7 and the optical filter 6 are integrally moved in the plane perpendicular to the optical axis OC. This procedure allows the image stabilization.

Figure 5:
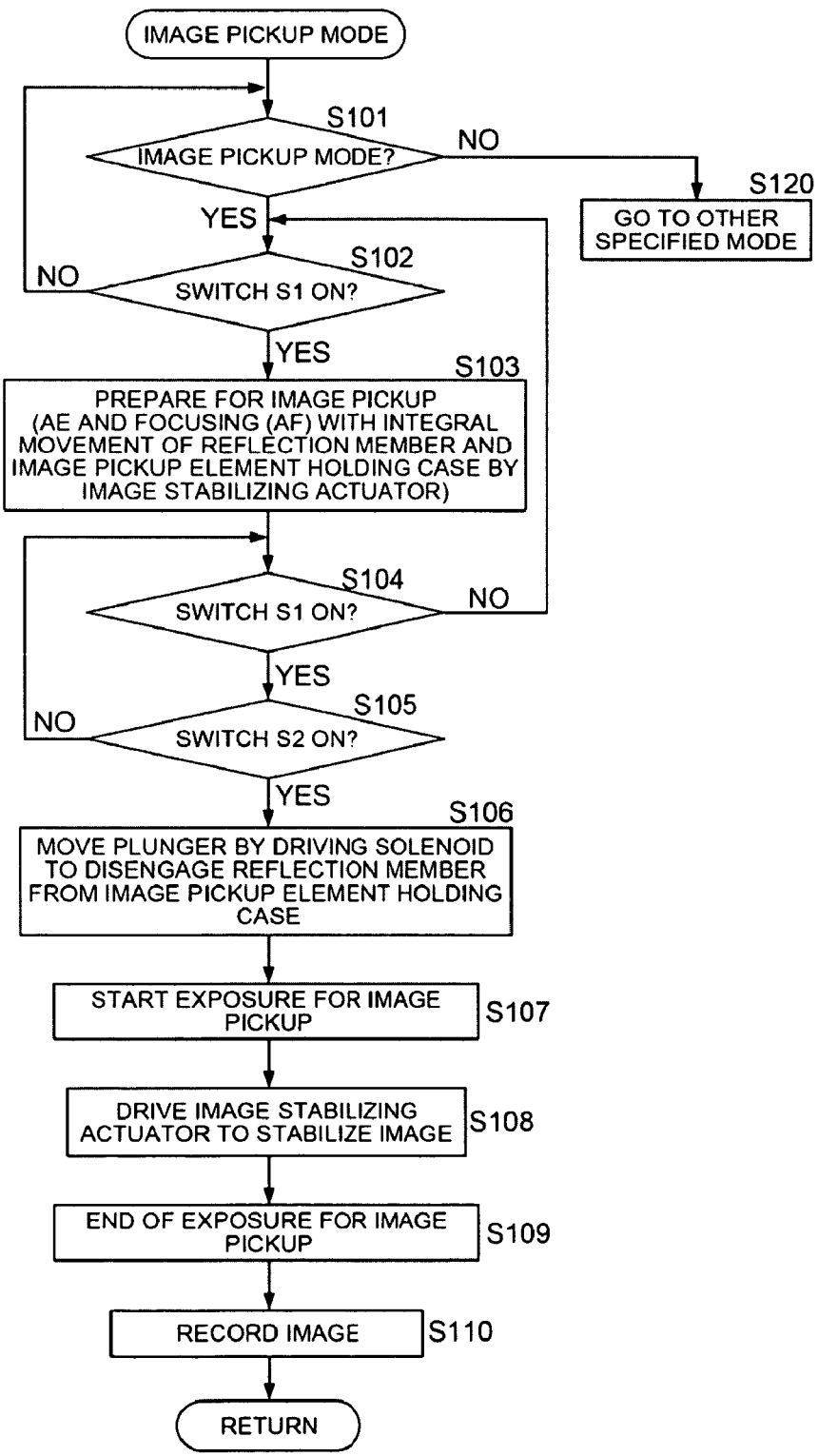
FIG. 5 is a flow chart showing an example of the operation of the image pickup apparatus equipped with the lens barrel as an embodiment.

FIG. 5 is a flow chart showing an example of the operation of the image pickup apparatus equipped with the lens barrel 50 as an embodiment. The operation of the lens barrel 50 of the embodiment is related to the image pickup mode, and hence the indication is given for the cases in the image pickup mode alone. The following describes the flow:

In the first place, a step is taken to determine whether or not the current mode is an image pickup mode (Step S101). If the current mode is the image pickup mode (Step S101: Yes), the system waits for the operation of turning on the switch S1 (Step S102) which is the operation of pressing the first step of the release button. If the current mode is not the image pickup mode (Step S101: No), a loop is formed between the Step S101 and Step S102. If the switch S1 is turned on (Step S102: Yes), preparation is made for image pickup operation (Step S103).

The preparation for image pickup operation includes the step of determining the exposure conditions (AE) for image recording at the time of image pickup and the step of automatic focusing (AF). As described above, in the AF of the present embodiment, the first drive actuator used for stabilizing image is driven with the image pickup element holding case and the prism holder for holding the prism as a reflection member engaged through a plunger, whereby the focal point is adjusted. The focused position can be detected by the conventionally known the mountain climbing method using output of the image pickup element, for example.

Upon completion of the step of preparing for image pickup operation, a step is again taken to determine whether or not the switch S1 is turned on (Step S104). If the switch S1 is not turned on (Step S104: No), the system goes back to the Step S102. If the switch S1 is turned on (Step S104: Yes), the system waits for the operation of turning on the switch S2 (Step S105) which is the operation of pressing the second step of the release button.

When the switch S2 has been turned on (Step S105: Yes), the solenoid is driven to move the plunger so that the prism holder for holding the prism as a reflection member is disengaged from the image pickup element holding case (Step S106). This is followed by the step of initiating the exposure for image pickup (Step S107). Concurrently with or immediately before the initiation of exposure for image pickup, the first drive actuator and second drive actuator are driven and image pickup element and the optical filter are integrally moved in the plane perpendicular to the optical axis OC, whereby the image is stabilized (Step S108). Upon expiration of the exposure time determined in Step S103, the exposure for image pickup operation terminates (Step S109). After that, the image pickup element output is subjected to a predetermined processing, and the image is then recorded, for example, on the memory card as a recording medium. Then the system goes back to the Step S101.

In Step S101, when the user has specified another mode using the operation switch group 150 (FIG. 2) (Step S101: No), the system goes to the specified mode (Step S120).

The above description refers to the operation of the image pickup apparatus equipped with a lens barrel of the present embodiment.

To be more specific, when power is varied, the prism holder 5h is engaged with the image pickup element holding case 66, and the first drive actuator 61P employed for stabilizing image is used to move the prism 5, optical filter 6 and image pickup element 7 to the position forming a focal point at the infinity indicated by the solid line P in FIG. 3(b) and FIG. 6(b). Similarly, before image pickup operation, the focus can be adjusted with reference to the subject by moving the prism 5, optical filter 6 and image pickup element 7 between the solid line P and the minimum distance indicated by broken line of FIG. 3(b) and FIG. 6(b), without having to install the actuator for adjusting the focal point which has been used in the conventional art.

At the time of image pickup, the plunger 8p is moved to release the engagement between the prism holder 5h and image pickup element holding case 66, and the optical filter 6 and image pickup element 7 are moved in the plane perpendicular to the optical axis OC by the first drive actuator 61P and the second drive actuator 61Y, whereby the image is stabilized.

This procedure reduces the number of actuators in the lens barrel and makes it possible to provide a slim, low-cost lens barrel.

In the aforementioned embodiment, the prism 12 corresponds to the first reflection member numbered from the object side, and the prism 5 corresponds to the n-th reflection member. The optical axis OC corresponding to an optical path after having been bent by the prism 5 is parallel to the optical axis OA corresponding to the optical path of the incident light flux entering the image pickup optical system. The image pickup element 7 is arranged at a position closer to the subject than the optical axis OB corresponding to the optical path after having been bent by the prism 12. The actuator is arranged on the side surface of the image pickup element. According to the structure, in the lens barrel including the image pickup element moving for stabilizing an image, a thinner and shorter lens barrel can be obtained even if the lens (lens 11 in FIGS. 3(a) and 3(b)) located closest to the subject protrudes from the lens barrel.

Figure 6:
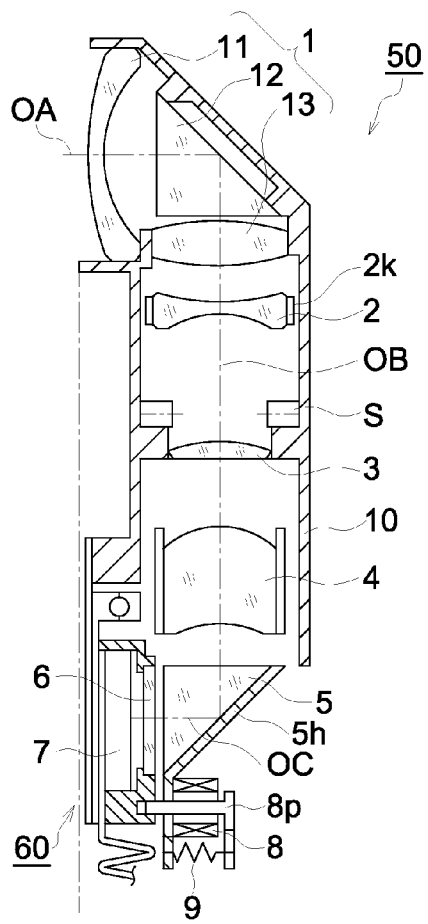
FIGS. 6(a) and 6(b) are schematic views representing another example of the lens barrel as an embodiment.
Figure 6:
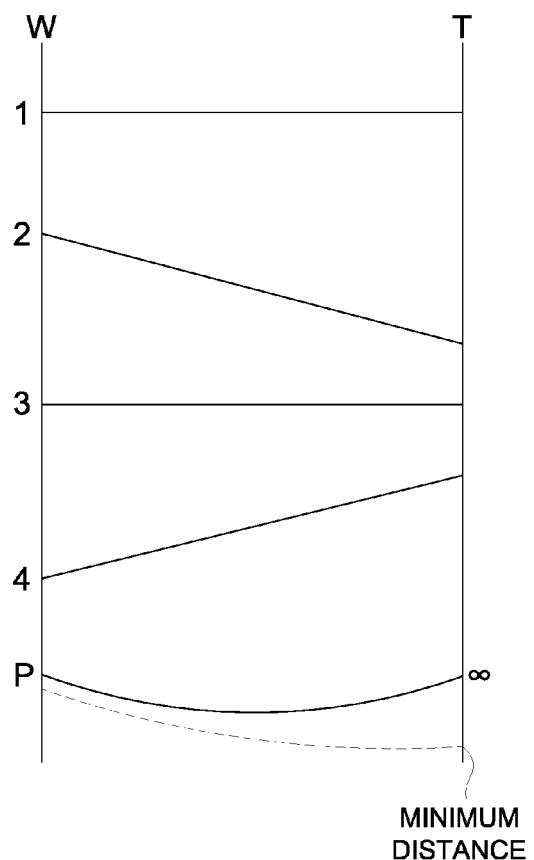

FIGS. 6(a) and 6(b) are schematic views representing another example of the lens barrel 50. FIG. 6(a) is a cross sectional view of the lens barrel 50. FIG. 6(*b*) shows the movement from the W (wide-angle end) of the lens group to the T (telephoto end) when the power is varied.

The lens barrel 50 of FIGS. 6(*a*) and 6(*b*) includes first lens group 1 having positive refractive power; second lens group 2 having negative refractive power; third lens group 3 having positive refractive power; and fourth lens group 4 having positive refractive power. The mechanism of FIG. 4 is arranged on the rear of the fourth lens group 4.

Lens tracks in FIG. 6(*b*) show that the second lens group 2 and the fourth lens group 4 are positioned away from the third lens group 3 at the time of wide-angle end. The lens tracks further show that as the power is varied toward the longer focus, the second lens group 2 and the fourth lens group 4 linearly move to a closer position to the lens group 3. This linear movement of the second lens group 2 and fourth lens group 4 can be provided by the screws each having different leads, wherein these screws are driven by one stepping motor.

The peripheral area of the prism holder 5*h* and image stabilizing mechanism 60 is the same as that described with reference to FIG. 4.

Figure 7:
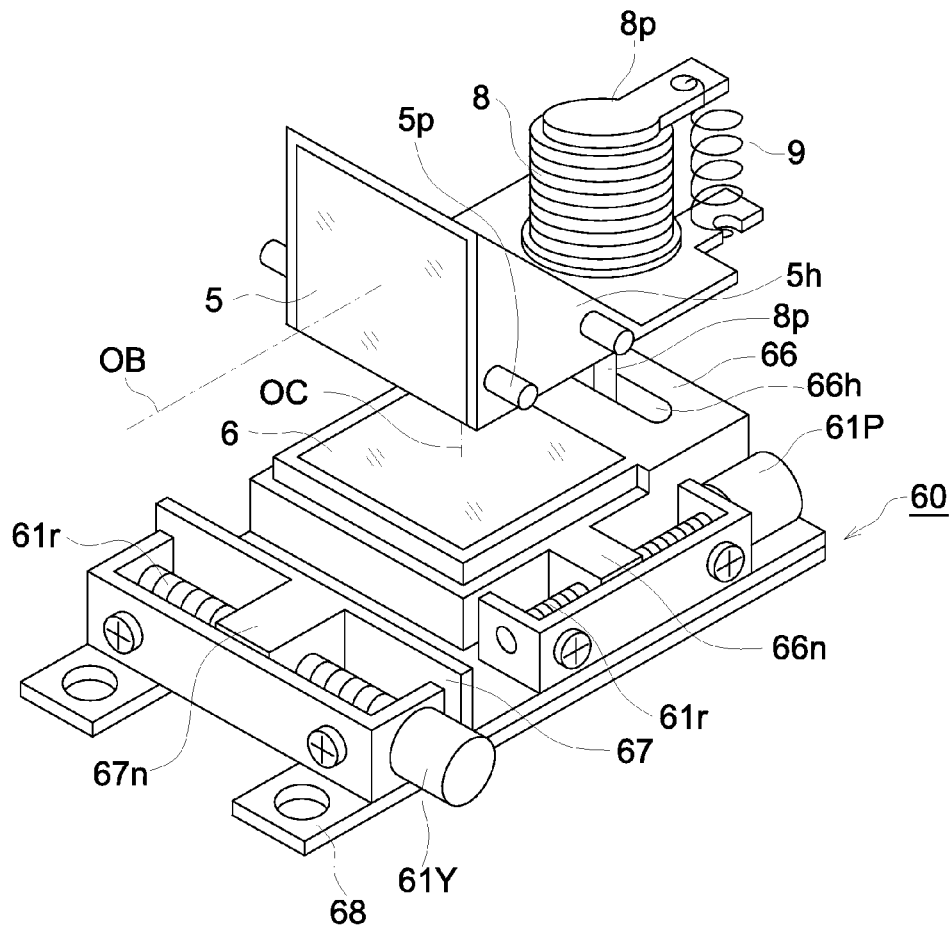
FIG. 7 is a perspective view representing another example of the area around the prism holder of the lens barrel and image stabilizing mechanism in an embodiment.

FIG. 7 is a perspective view representing another example of the area around the prism holder 5*h* of the lens barrel and image stabilizing mechanism 60. Only the mechanism of FIG. 7 different from those described with reference to FIG. 4 will be described.

In the image stabilizing mechanism 60 of FIG. 7, a stepping motor are used as the first drive actuator 61P or the second drive actuator 61Y.

Lead screw 61*r* driven by the stepping motor as the first drive actuator 61P is screwed with threading section 66*n* formed on the image pickup element holding case 66. The image pickup element holding case 66 being engaged is moved parallel to the optical axis CB by controlling the direction of the rotation of the stepping motor as the first drive actuator 61P and the amount of rotation.

The lead screw 61*r* rotated by the stepping motor as the second drive actuator 61Y is engaged with the threading section 67*n* formed on the traveling plate 67. The traveling plate 67 screwed with the lead screw 61*r* is moved in the direction perpendicular to the optical axes OC and OB by controlling the direction of the rotation of the stepping motor as the second drive actuator 61Y and the amount of rotation.

As described above, when the stepping motor is used as the first drive actuator 61P or the second drive actuator 61Y, it is possible to get the same operation and advantages as those when the aforementioned piezoelectric element is used.

In the aforementioned description of the example, reflection members for bending optical paths (optical axis) are used at two positions. Without the present invention being restricted thereto, they can be used at three positions.

Figure 8:
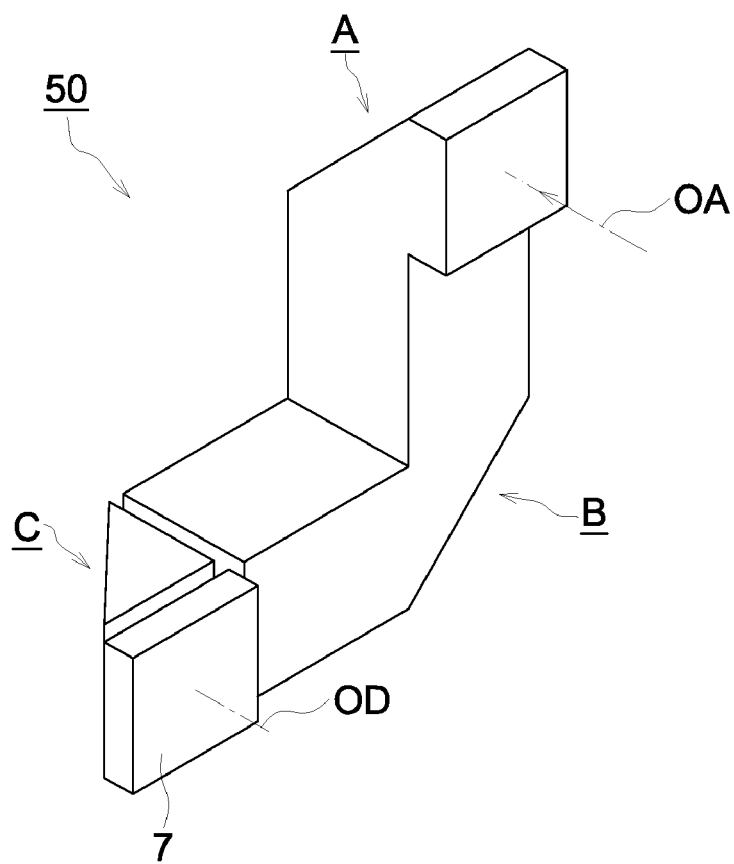
FIG. 8 is a perspective view schematically showing the lens barrel with reflection members arranged at three positions.

FIG. 8 is a perspective view schematically showing the lens barrel 50 with reflection members arranged at three positions.

As shown in FIG. 8, reflection surface A is arranged to bend the optical path of the incident light flux corresponding to the optical axis OA, and reflection surface B is provided to further bend the optical path having been bent by the reflection surface A within the plane perpendicular to the optical path of the incident light flux. The optical path having been bent by the reflecting surface B is bent by the reflecting surface C in the direction OD which is parallel to the optical path of the incident light flux corresponding to the optical axis OA. The image pickup element 7 is arranged on the optical path having been bent by the reflecting surface C. This arrangement provides the aforementioned advantages.

To be more specific, the advantages are provided by the following structure: when the plurality of reflection members are placed at n positions with the image pickup optical system and the plurality of reflection members includes the first reflection member to the n-th member as numbered from the subject side to the image plane, the (n−1)-th reflection member is arranged so as to bend an incident optical path in a direction in the plane perpendicular to the optical path of the incident light flux entering the image pickup optical system, and the n-th reflection member is arranged to bend an incident optical path in a direction parallel to the optical path of the incident light flux entering the image pickup optical system.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

In the above description, the plunger driven by the solenoid is used for providing engagement between the prism holder 5*h* and image pickup element holding case 66. The present invention is not restricted thereto, and the mechanism to be adopted is capable of engagement and disengagement.

Figure 3:
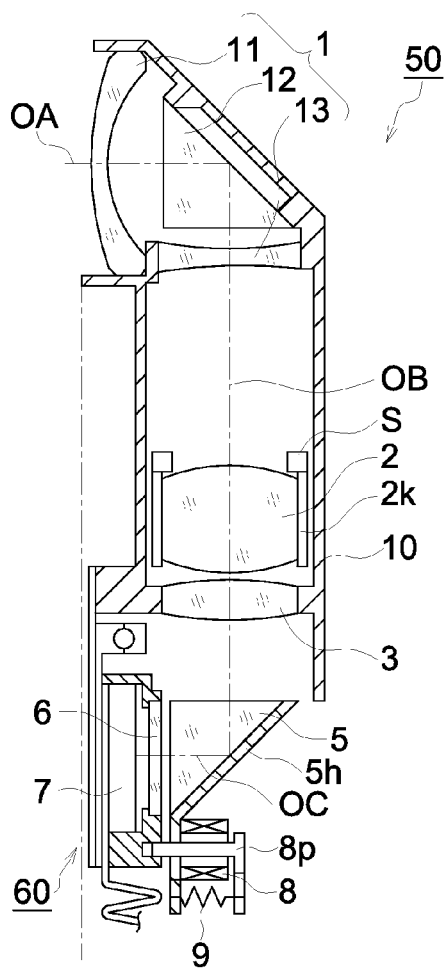
FIGS. 3(a) and 3(b) are schematic diagrams representing an example of the lens barrel as an embodiment.
Figure 3:
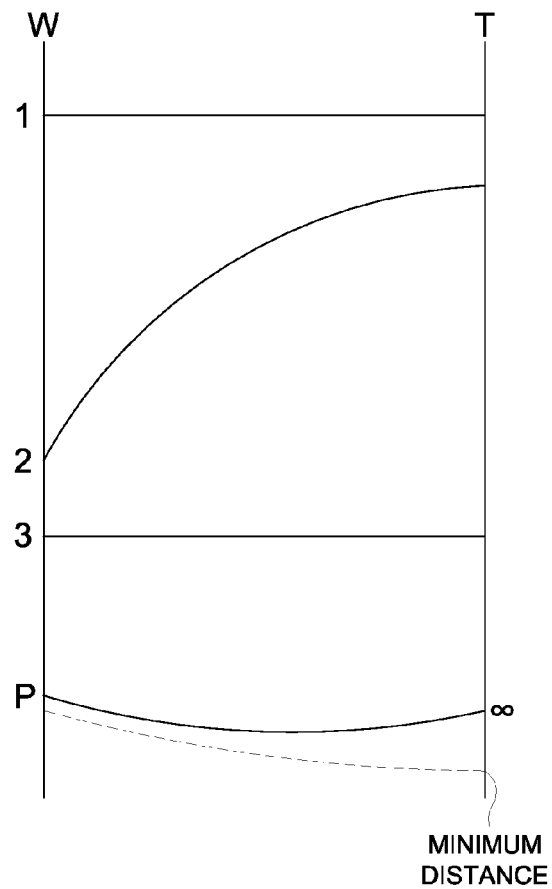

In the above description with reference to the cross sectional view of FIGS. 3(*a*) and 3(*b*), and FIGS. 6(*a*) and 6(*b*), the image pickup element is arranged at a position closer to the subject than the optical path after having been bent by the (n−1)-th reflection member. It is also possible to make such arrangements that the optical path having been bent by the n-th reflection member is bent in a direction parallel to the optical path of the incident light flux and in the direction facing the subject, and the image pickup surface of the image pickup element is placed with facing the subject.

In the above description of the embodiment, the stepping motor or piezoelectric element is used as the actuator. Without the present invention being restricted thereto, a voice coil motor can be used as the actuator.

What is claimed is:

1. A lens barrel comprising:
   an image pickup optical system comprising a plurality of lenses transmitting a light flux from a subject;
   an image converting the pickup light flux element from the for photo-electrically subject transmitted by the image pickup optical system;
   a plurality of reflection members including first to n-th reflection members in order from the subject, the first reflection member being arranged at a position to bend an optical path of an incident light flux to enter the image pickup optical system, a (n−1)-th reflection member being arranged at a position to bend an optical path in a direction in a plane perpendicular to the optical path of the incident light flux, the n-th reflection member being arranged at a position closest to an image plane of the image pickup optical system to bend an optical path in a direction parallel to the optical path of the incident light flux; and
   an actuator for moving the image pickup element in a plane perpendicular to an optical path bent by the n-th reflection member for stabilizing an image,
   wherein the n-th reflection member and the image pickup element move in a direction parallel to an optical path bent by the (n−1)-th reflection member for an adjustment of a focal point of the image pickup optical system.

2. The lens barrel of claim 1,
   wherein the image pickup element is arranged at a position closer to the subject than an optical path bent by the (n−1)-th reflection member.

3. The lens barrel of claim 1,
wherein the actuator moves the n-th reflection member and the image pickup element for the adjustment of the focal point.

4. The lens barrel of claim 1,
wherein the actuator is arranged on a side surface of the image pickup element.

5. The lens barrel of claim 1,
wherein the image pickup optical system comprises in order from the subject:
a first lens group having a negative refractive power;
a second lens group having a positive refractive power and moving for varying power of the image pickup optical system; and
a third lens group having a positive refractive power.

6. The lens barrel of claim 1,
wherein the image pickup optical system comprises in order from the subject:
a first lens group having a positive refractive power;
a second lens group having a negative refractive power and moving linearly for varying power of the image pickup optical system;
a third lens group having a positive refractive power; and
a fourth lens group having a positive refractive power and moving linearly for varying power of the image pickup optical system.

7. An image pickup apparatus comprising the lens barrel of claim 1.

8. A lens barrel comprising:
an image pickup optical system comprising a plurality of lenses transmitting a light flux from a subject;
an image pickup element for photo-electrically converting the light flux from the subject transmitted by the image pickup optical system;
a plurality of reflection members including first to nth reflection members in order from the subject, the first reflection member being arranged at a position to bend an optical path of an incident light flux to enter the image pickup optical system, a (n−1)-th reflection member being arranged at a position to bend an optical path in a direction in a plane perpendicular to the optical path of the incident light flux, the n-th reflection member being arranged at a position closest to an image plane of the image pickup optical system to bend an optical path in a direction parallel to the optical path of the incident light flux; and
an actuator for moving the image pickup element in a plane perpendicular to an optical path bent by the n-th reflection member for stabilizing an image,
wherein the image pickup element is arranged at a position closer to the subject than an optical path bent by the (n−1)-th reflection member.

9. The lens barrel of claim 8,
wherein the image pickup optical system comprises in order from the subject:
a first lens group having a negative refractive power;
a second lens group having a positive refractive power and moving for varying power of the image pickup optical system; and
a third lens group having a positive refractive power.

10. The lens barrel of claim 8,
wherein the image pickup optical system comprises in order from the subject:
a first lens group having a positive refractive power;
a second lens group having a negative refractive power and moving linearly for varying power of the image pickup optical system;
a third lens group having a positive refractive power; and
a fourth lens group having a positive refractive power and moving linearly for varying power of the image pickup optical system.

* * * * *